United States Patent
Fard et al.

(10) Patent No.: US 12,063,975 B2
(45) Date of Patent: Aug. 20, 2024

(54) SYSTEMS FOR MANAGING SMOKING SUBSTITUTE DEVICES AND ASSOCIATED METHODS

(71) Applicant: Imperial Tobacco Limited

(72) Inventors: Daniel Fard, Liverpool (GB); Oliver Talbot, Liverpool (GB)

(73) Assignee: Imperial Tobacco Limited, Bristol (GB)

( * ) Notice: Subject to any disclaimer, the term of this patent is extended or adjusted under 35 U.S.C. 154(b) by 1031 days.

(21) Appl. No.: 17/002,062

(22) Filed: Aug. 25, 2020

(65) Prior Publication Data

US 2021/0068468 A1 Mar. 11, 2021

Related U.S. Application Data

(63) Continuation of application No. PCT/EP2019/053506, filed on Feb. 13, 2019.

(30) Foreign Application Priority Data

Feb. 26, 2018 (GB) ..................................... 1803033

(51) Int. Cl.
*A24F 40/53* (2020.01)
*A24F 40/60* (2020.01)
(Continued)

(52) U.S. Cl.
CPC ............... *A24F 40/53* (2020.01); *A24F 40/60* (2020.01); *A24F 40/65* (2020.01); *H04W 4/80* (2018.02); *H04W 12/06* (2013.01); *A24F 40/10* (2020.01)

(58) Field of Classification Search
CPC .......... A24F 40/53; A24F 40/60; A24F 40/65; A24F 40/10; H04W 4/80; H04W 12/06; H04M 1/72403; H04M 1/72412
See application file for complete search history.

(56) References Cited

U.S. PATENT DOCUMENTS

2013/0306084 A1 11/2013 Flick
2013/0319439 A1 12/2013 Gorelick et al.
(Continued)

FOREIGN PATENT DOCUMENTS

CA 3147101 A1 * 1/2021 ............. G06F 21/44
EP 3275325 A2 1/2018
(Continued)

OTHER PUBLICATIONS

International Search Report, mailed Apr. 10, 2019, in PCT/EP2019/053506, filed Feb. 13, 2019.
(Continued)

*Primary Examiner* — Shawntina T Fuqua
(74) *Attorney, Agent, or Firm* — DUNLAP CODDING, P.C.

(57) ABSTRACT

A system for managing a smoking substitute device, the system including: a smoking substitute device, including a main body and a consumable configured to be physically coupled to the main body; wherein the consumable is associated with validity state information from which it can be determined whether the consumable is valid for use with the main body; wherein the system is configured to determine from the validity state information whether the consumable is valid for use with the main body and, if the system determines from the validity state information that the consumable is not valid for use with the main body, inhibit use of the consumable with the main body. An associated method is also disclosed.

17 Claims, 5 Drawing Sheets

(51) Int. Cl.
*A24F 40/65* (2020.01)
*H04W 4/80* (2018.01)
*H04W 12/06* (2021.01)
*A24F 40/10* (2020.01)

(56) References Cited

U.S. PATENT DOCUMENTS

| | | |
|---|---|---|
| 2015/0245654 A1 | 9/2015 | Memari et al. |
| 2016/0129182 A1 | 5/2016 | Schuster et al. |
| 2016/0231309 A1* | 8/2016 | Ahmad ............... A61B 5/0022 |
| 2017/0014582 A1 | 1/2017 | Skoda |
| 2017/0030882 A1 | 2/2017 | Skoda |
| 2017/0042246 A1 | 2/2017 | Lau et al. |
| 2018/0020729 A1 | 1/2018 | Alarcon et al. |
| 2018/0043114 A1* | 2/2018 | Bowen .................... A24F 40/60 |
| 2020/0000143 A1* | 1/2020 | Anderson ............... G06F 18/22 |
| 2021/0045453 A1* | 2/2021 | Fard ...................... H04L 63/102 |

FOREIGN PATENT DOCUMENTS

| | | |
|---|---|---|
| GB | 2542008 A | 3/2017 |
| GB | 2542012 A | 3/2017 |
| WO | WO 2016/199066 | 12/2016 |
| WO | WO 2017/037457 A1 | 3/2017 |
| WO | WO 2017/205692 A1 | 11/2017 |

OTHER PUBLICATIONS

Written Opinion of the International Searching Authority, mailed Apr. 10, 2019, in PCT/EP2019/053506, filed Feb. 13, 2019.
UKIPO Search Report (GB1803033.8), dated Jun. 27, 2018, 11 pages.

* cited by examiner

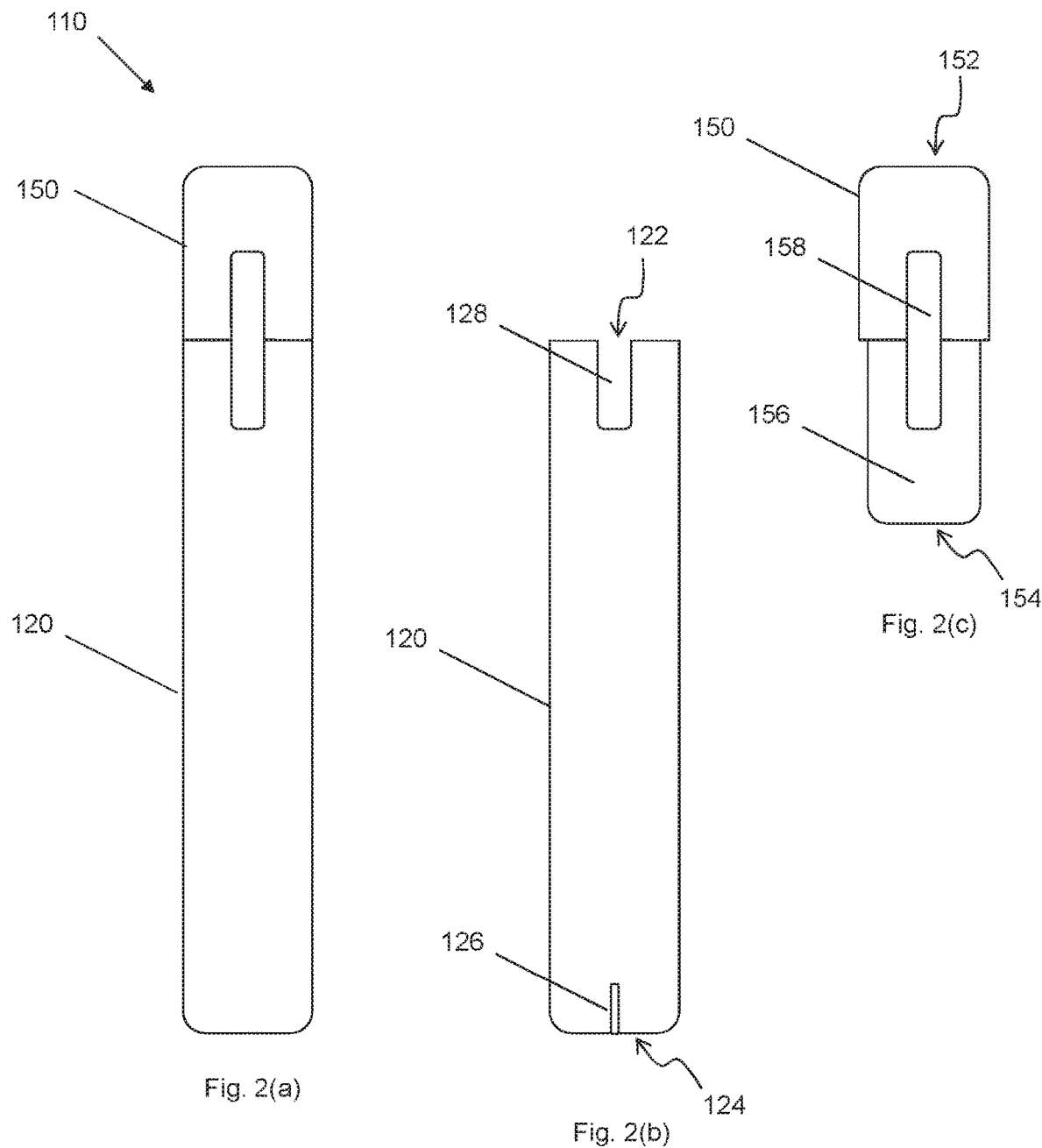

| Consumable ID | Expiry date | Lost/stolen? |
|---|---|---|
| 000001 | 31/12/18 | No |
| 000002 | 31/12/18 | No |
| 000003 | 31/12/20 | No |
| 000004 | 31/12/20 | Yes |

Fig. 4(a)

| Device ID | Lost/stolen? |
|---|---|
| 000001 | Yes |
| 000002 | No |
| 000003 | No |
| 000004 | No |

Fig. 4(b)

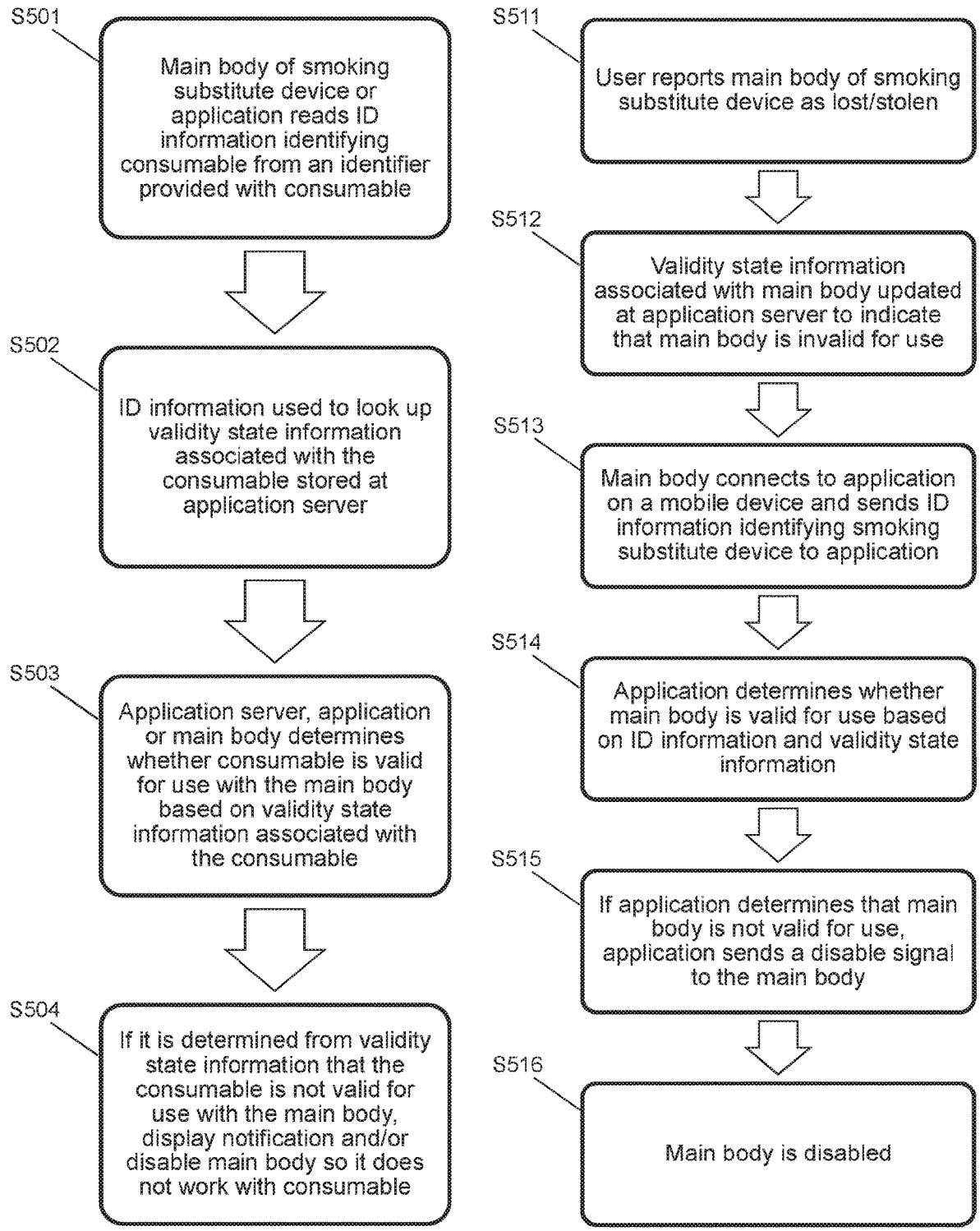

SYSTEMS FOR MANAGING SMOKING SUBSTITUTE DEVICES AND ASSOCIATED METHODS

CROSS-REFERENCE TO RELATED APPLICATIONS/INCORPORATION BY REFERENCE STATEMENT

The present patent application is a continuation of International Application No. PCT/EP2019/053506, filed Feb. 13, 2019; which claims priority to the patent application identified by GB Serial No. 1803033.8, filed on Feb. 26, 2018. The entire contents of each of the above-referenced patent(s)/patent application(s) are hereby expressly incorporated by reference herein.

TECHNICAL FIELD

The present disclosure relates to systems for managing smoking substitute devices and associated methods.

BACKGROUND

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices may comprise electronic systems that permit a user to simulate the act of smoking by producing an aerosol, also referred to as a "vapour", that is drawn into the lungs through the mouth (inhaled) and then exhaled. The inhaled aerosol typically bears nicotine and/or flavourings without, or with fewer of, the odour and health risks associated with traditional smoking.

In general, smoking substitute devices are intended to provide a substitute for the rituals of smoking, whilst providing the user with a similar experience and satisfaction to those experienced with traditional smoking and tobacco products.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilising a different smoking substitute approach. A smoking substitute approach corresponds to the manner in which the substitute system operates for a user.

One approach for a smoking substitute device is the so-called "vaping" approach, in which a vapourisable liquid, typically referred to (and referred to herein) as "e-liquid", is heated by a heating device to produce an aerosol vapour which is inhaled by a user. An e-liquid typically includes a base liquid as well as nicotine and/or flavourings. The resulting vapour therefore typically contains nicotine and/or flavourings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapour") which is inhaled by a user through the mouthpiece.

Vaping smoking substitute devices can be configured in a variety of ways. For example, there are "closed system" vaping smoking substitute devices which typically have a sealed tank and heating element which is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, the main body can be reused by connecting it to a new consumable. Another subset of closed system vaping smoking substitute devices are completely disposable, and intended for one-use only.

There are also "open system" vaping smoking substitute devices which typically have a tank that is configured to be refilled by a user, so the device can be used multiple times.

An example vaping smoking substitute device is the myblu™ e-cigarette. The myblu™ e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapour which is inhaled by a user through the mouthpiece.

Another example vaping smoking substitute device is the blu PRO™ e-cigarette. The blu PRO™ e-cigarette is an open system device which includes a main body, a (refillable) tank, and a mouthpiece. The main body and tank are physically and electrically coupled together by screwing one to the other. The mouthpiece and refillable tank are physically coupled together by screwing one of the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapour which is inhaled by a user through the mouthpiece.

Another approach for a smoking substitute device is the so-called "heat not burn" ("HNB") approach in which tobacco (rather than e-liquid) is heated or warmed to release vapour. The tobacco may be leaf tobacco or reconstituted tobacco. The vapour may contain nicotine and/or flavourings. In the HNB approach the intention is that the tobacco is heated but not burned, i.e. does not undergo combustion.

A typical HNB smoking substitute device may include a main body and a consumable. The consumable may include the tobacco material. The main body and consumable may be configured to be physically coupled together. In use, heat may be imparted to the tobacco material by a heating device that is typically located in the main body, wherein airflow through the tobacco material causes moisture in the tobacco material to be released as vapour. A vapour may be formed from a carrier in the tobacco material (this carrier may for example include propylene glycol and/or vegetable glycerin) and additionally volatile compounds released from the tobacco. The released vapour may be entrained in the airflow drawn through the tobacco.

As the vapour passes through the smoking substitute device (entrained in the airflow) from an inlet to a mouthpiece (outlet), the vapour cools and condenses to form an aerosol (also referred to as a vapour) for inhalation by the user. The aerosol will normally contain the volatile compounds.

In HNB smoking substitute devices, heating as opposed to burning the tobacco material is believed to cause fewer, or smaller quantities, of the more harmful compounds ordinarily produced during smoking. Consequently, the HNB approach may reduce the odour and/or health risks that can arise through the burning, combustion and pyrolytic degradation of tobacco.

An example of the HNB approach is the IQOS™ smoking substitute device from Philip Morris Ltd. The IQOS™ smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapour and flavourings which may be drawn through the mouthpiece by the user through inhalation.

A second example of the HNB approach is the device known as "Glo"™ from British American Tobacco p.l.c. Glo™ comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapour and flavourings which may be drawn through the consumable by the user through inhalation. The tobacco, when heated by the heating device, is configured to produce vapour when heated rather than when burned (as in a smoking apparatus, e.g. a cigarette). The tobacco may contain high levels of aerosol formers (carrier), such as vegetable glycerine ("VG") or propylene glycol ("PG").

The present inventor(s) have observed that most smoking substitute devices currently on the market are configured to operate in isolation of other devices, which limits the functions the smoking substitute devices can perform.

The present inventor(s) have observed that a smoking substitute device can become lost or stolen, and in such circumstances may fall into the hands of a person that should not be using the device, e.g. a thief or a child.

The present inventor(s) have observed that consumable material that is typically present in a smoking substitute device can degrade. This can cause a loss of taste. In the case of e-liquid, degradation of the e-liquid may cause components of the smoking substitute device to degrade, e.g. one or more components of a consumable in which the e-liquid is stored.

The present disclosure has been devised in light of the above considerations.

BRIEF DESCRIPTION OF THE DRAWINGS

Embodiments and experiments illustrating the principles of the present disclosure will now be discussed with reference to the accompanying figures in which:

FIG. 2(a) shows an example smoking substitute device for use as the smoking substitute device in the system of FIG. 1.

FIG. 2(b) shows the main body of the smoking substitute device of FIG. 2(a) without the consumable.

FIG. 2(c) shows the consumable of the smoking substitute device of FIG. 2(a) without the main body.

FIG. 4(a) shows an example of validity state information associated with a plurality of consumables that could be stored at the application server in the system of FIG. 1.

FIG. 4(b) shows an example of validity state information associated with a plurality of smoking substitute devices that could be stored at the application server in the system of FIG. 1.

FIG. 5(a) shows an example method that could be performed by the system of FIG. 1, using the validity state information of FIG. 4(a).

FIG. 5(b) shows an example method that could be performed by the system of FIG. 1, using the validity state information of FIG. 4(b).

DETAILED DESCRIPTION

Figure 1:
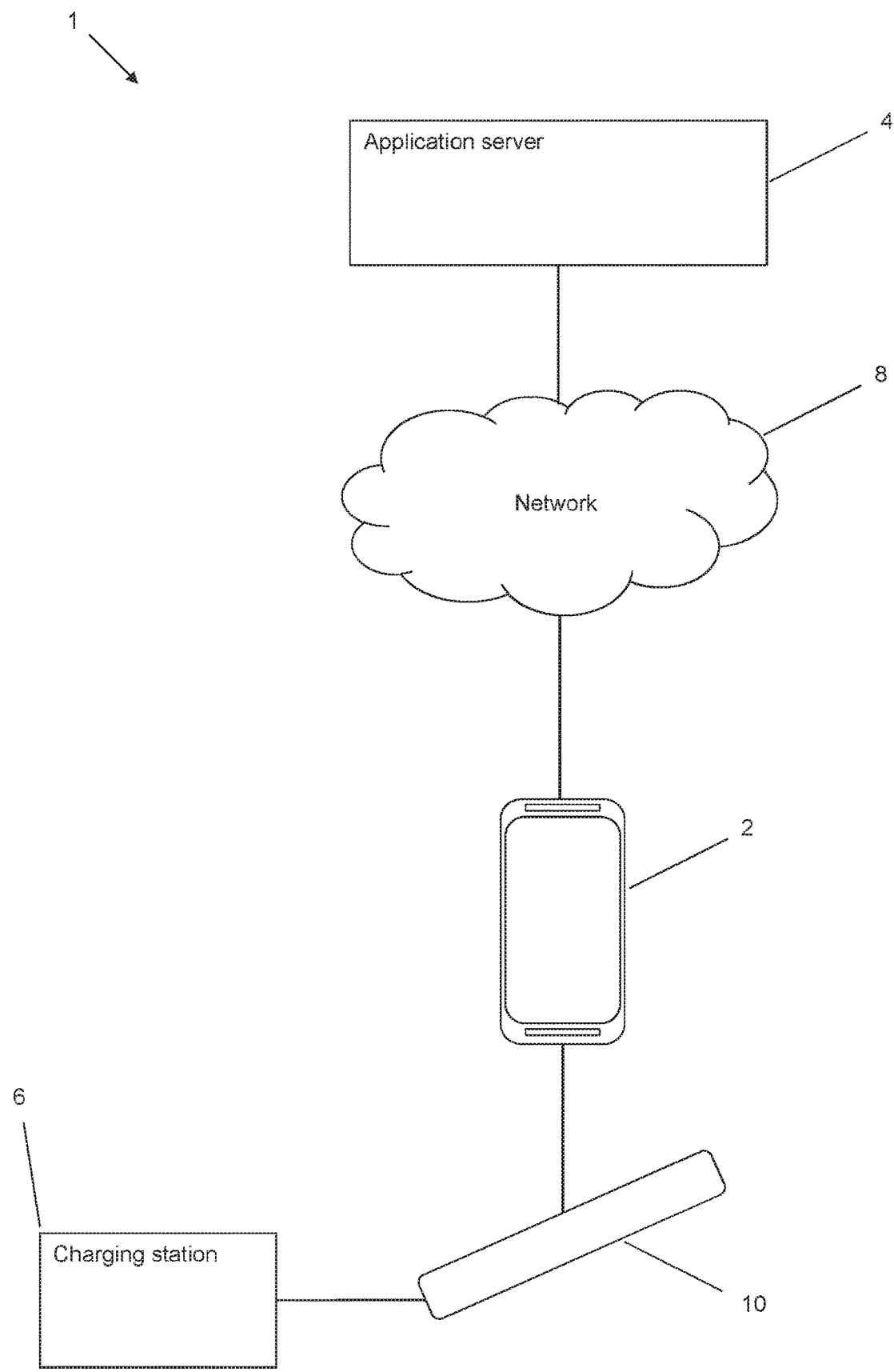
FIG. 1 shows an example system for managing a smoking substitute device.

A first non-limiting aspect of the present disclosure may provide a system for managing a smoking substitute device, the system including: a smoking substitute device, including a main body and a consumable configured to be physically coupled to the main body; wherein the consumable is associated with validity state information from which it can be determined whether the consumable is valid for use with the main body; wherein the system is configured to determine from the validity state information whether the consumable is valid for use with the main body and, if the system determines from the validity state information that the consumable is not valid for use with the main body, inhibit use of the consumable with the main body.

In this way, the validity state information can be set to inhibit use of the consumable with the main body in circumstances in which it might not be desirable for the main body to be operated with the consumable, e.g. where an expiry date for the consumable has elapsed.

The system may include a mobile device on which an application installed, wherein the smoking substitute device (and in certain non-limiting embodiments, the main body of the smoking substitute device) is configured to communicate with the application. The smoking substitute device (and in certain non-limiting embodiments, the main body of the smoking substitute device) may be configured to wirelessly communicate with the application, e.g. via a wireless interface on the smoking substitute device (and in certain non-limiting embodiments, on the main body of the smoking substitute device) and a corresponding wireless interface on the mobile device.

The system may include an application server. The application on the mobile phone may be configured to communicate with the application server, e.g. via a network.

Any one or more of the main body, the application (if present), the application server (if present) may be used to determine from the validity state information whether the consumable is valid for use with the main body. For avoidance of any doubt, in some examples the system for managing a smoking substitute device may include the main body and consumable and no other components.

By way of example, the validity state information associated with the consumable could include an expiry date. A determination of whether the consumable is valid for use with the main body may include checking whether the expiry date has elapsed. If the expiry date is found to have elapsed (as a result of this check), it may be determined that the consumable is not valid for use with the main body. If the determination of whether the consumable is valid for use with the main body is performed by the main body, the main body may include a clock (for determining a local time and/or date) in order to determine whether an expiry date has elapsed.

By way of example, the validity state information associated with the consumable could include an invalidity flag. The invalidity flag associated with the consumable could include a 'valid' state indicating that the consumable is valid and an 'invalid' state indicating that the consumable is not valid. A determination of whether the consumable is valid for use with the main body may include checking whether the invalidity flag associated with the consumable indicates that the consumable is valid or invalid. If (upon checking) the invalidity flag associated with the consumable indicates that the consumable is invalid, it may be determined that the consumable is not valid for use with the main body.

By way of example, the validity state information associated with the consumable could include compatibility information for determining whether the main body is compatible with the consumable. The compatibility information could be provided e.g. in the form of a list of models of main body compatible with the consumable. A determination of whether the consumable is valid for use with the main body may include checking whether the compatibility information indicates that the main body is compatible or not compatible with the consumable. If the main body is found to be incompatible with the consumable (as a result of this check), it may be determined that the consumable is not valid for use with the main body.

A determination of whether the consumable is valid for use with the main body may include determining that the consumable is valid for use with the main body unless it is determined based on an item of validity state information (e.g. by performing one or more of the checks as described above) that the consumable is not valid for use with the main body.

The list of examples of validity state information as set out above is not intended to be exhaustive. Other examples of validity state information associated with the consumable potentially be envisaged by a skilled person.

Each of the above-listed examples of validity state information could be used alone, or in combination with one or more other items of validity state information (whether listed above or otherwise).

As a first mechanism by which the system could obtain validity state information associated with the consumable (from which it can be determined whether the consumable is valid for use with the main body), the system may be configured to obtain validity state information associated with the consumable by: reading ID information identifying the consumable from an identifier provided with the consumable; and using the ID information to look up the validity state information associated with the consumable.

The ID information could uniquely identify the consumable, or uniquely identify a batch of consumables that includes the consumable, for example. In certain non-limiting embodiments, the ID information allows the validity state information associated with the consumable to be looked up by the system, e.g. using the application and/or the application server.

In certain non-limiting embodiments, the validity state information associated with the consumable is stored at the application server. The validity state information may be associated with the consumable by being stored in association with ID information identifying the consumable at the application server, e.g. with the ID information identifying the consumable and the validity state information associated with the consumable being stored in the same row of a table at the application server.

An advantage of storing the validity state information associated with the consumable at the application server is that the validity state information can be updated by an application server administrator after the consumable has left the control of a supplier (e.g. brand owner) of the consumable. This might be useful if, for example, it is found after the consumable has left the control of the supplier that the consumable is faulty, or has been stolen, and the supplier wants to inhibit or prevent use of the consumable (e.g. by setting an invalidity flag associated with the consumable to be false, or by setting an expiry date associated with the consumable to be in the past).

It would also be possible for the validity state information associated with the consumable to be stored locally by the mobile device/application, or by the main body. For example, the mobile device/application or main body could maintain a local list of ID information for stolen consumables.

In certain non-limiting embodiments, the identifier provided with the consumable is included on or within the consumable. For example, the identifier could be integrally formed on a body of the consumable, e.g. in the form of an ID number. However, the identifier could also be included in packaging accompanying the consumable, for example.

The identifier provided with the consumable could be provided in the form of a machine readable tag which stores the ID information. In certain non-limiting embodiments, the machine readable tag is included in the consumable.

The machine readable tag could be an RFID tag configured to be read by an RFID reader on the main body of the smoking substitute device. The main body of the smoking substitute device may be configured to communicate the ID information read from the RFID tag to the application on the mobile device. The RFID reader and RFID tag could respectively be located so that the RFID reader can read the RFID tag on the consumable when (and in certain non-limiting embodiments, only when) the consumable is physically coupled to the main body.

The machine readable tag could store the ID information in a visual pattern such as a linear or 2D barcode. In this case, the stored information could be read by the application on the mobile device using a camera on the mobile device, for example.

Instead of the identifier being provided in the form of a machine readable tag, the identifier could instead be an ID number which could, e.g. be read by the system through a user entering the ID number manually into the application installed on the mobile device.

If the ID information is read by the main body of the smoking substitute device, in certain non-limiting embodiments, the main body communicates the ID information to the application on the mobile device.

The application on the mobile device may be configured to communicate the ID information to the application server so that the application server could look up the validity state information associated with the consumable. Once the validity state information has been looked up by the application server, the determination by the system of whether the consumable is valid for use with the main body (from the validity state information) could be performed by any of the application server, the application or the main body. Conveniently, this determination may be performed by the application or the application server.

As a second mechanism by which the system could obtain validity state information associated with the consumable (from which it can be determined whether the consumable is valid for use with the main body), the main body may be configured to read the validity state information from a machine readable tag provided with the consumable.

Similarly to the first mechanism (described above), in certain non-limiting embodiments, the machine readable tag is included in the consumable.

Similarly to the first mechanism (described above), the machine readable tag could be an RFID tag configured to be read by an RFID reader on the main body of the smoking substitute device. The main body of the smoking substitute device may be configured to communicate the validity state information read from the RFID tag to the application on the mobile device (though this is not a necessary step, since there is no need to look up the validity state information when it has been read directly from the RFID tag). The RFID reader and RFID tag could respectively be located in the main body and consumable so that the RFID reader can read the RFID tag on the consumable when (and in certain non-limiting embodiments, only when) the consumable is physically coupled to the main body.

Similarly to the first mechanism (described above), the machine readable tag could store the validity state information in a visual pattern such as a linear or 2D barcode. In this case, the stored information could be read by the application on the mobile device using a camera on the mobile device, for example.

Here it is to be noted that where the main body reads the validity state information from a machine readable tag provided with the consumable, the steps of determining whether the consumable is valid for use with the main body, and inhibiting use of the consumable with the main body could both be performed by the main body, without requiring the system to include any other elements (e.g. the application or application server).

If the system determines from the validity state information that the consumable is not valid for use with the main body, the system may be configured to inhibit use of the consumable with the main body in various ways.

For example, if the system determines from the validity state information that the consumable is not valid for use with the main body, the system may be configured to inhibit use of the consumable with the main body by displaying a notification for informing a user that the consumable is not valid for use with the main body. This notification could e.g. involve operating a light on the main body (e.g. the light being operated according to a predetermined sequence) and/or a notification displayed by the application on the mobile device.

As another example, if the system determines from the validity state information that the consumable is not valid for use with the main body, the system may be configured to inhibit use of the consumable with the main body by disabling the main body such that it does not work with the consumable.

For avoidance of any doubt the system may be configured to inhibit use of the consumable with the main body by displaying a notification and disabling the main body. However, it is also possible for a notification to be displayed without disabling the main body, e.g. so that a user can ignore the notification if they are minded to do so.

Disabling the main body such that it does not work with the consumable could be achieved, for example, by configuring the main body to not activate (e.g. not pass electrical power to a heating device of the smoking substitute device) when the consumable is physically coupled to the main body.

In order to allow the main body to be disabled in this way, the system may be configured to recognize when a consumable determined by the system as being not valid for use with the main body is physically coupled to the main body (e.g. so that the system 'knows' that the main body should not activate whilst that consumable is physically coupled to the main body).

As a first example, the system may be configured to recognize when a consumable determined by the system as being not valid for use with the main body is physically coupled to the main body by: the system being configured to obtain the validity information associated with the consumable whilst the consumable is physically coupled to the main body, then determining from the validity state information whether the consumable is valid for use with the main body.

This could be achieved, for example, by the main body being configured to read the validity state information from a machine readable tag provided with the consumable when (and in certain non-limiting embodiments, only when) the consumable is physically coupled to the main body, e.g. as described above.

As a second example, the system may be configured to recognize when a consumable determined by the system as being not valid for use with the main body is physically coupled to the main body by: prompting (e.g. via the application installed on the mobile device) a user to present an identifier provided with a consumable to a component of the system (e.g. to the main body or the mobile device) so that that component of the system can obtain/read ID information identifying the consumable from the identifier provided with the consumable (e.g. in a manner as described above), before the user physically couples the consumable to the main body or whilst the consumable is physically coupled to the main body; using the ID information to look up the validity state information associated with the consumable (e.g. in a manner as described above); and determining from the validity state information whether the consumable is valid for use with the main body.

In this second example, the system may be configured to disable the main body such that it does not work with any consumable physically connected to the main body, until it has determined that a consumable is valid for use with the main body based on ID information obtained/read from an identifier provided with the consumable.

The smoking substitute device may be a vaping smoking substitute device including a main body and a consumable, or a heat not burn smoking substitute device including a main body and a consumable.

A second non-limiting aspect of the present disclosure may provide a method performed by a system according to the first non-limiting aspect of the present disclosure.

The second non-limiting aspect of the present disclosure may, for example, provide a method performed by a system for managing a smoking substitute device, wherein the system includes a smoking substitute device, including a main body and a consumable configured to be physically coupled to the main body, and wherein the consumable is associated with validity state information from which it can be determined whether the consumable is valid for use with the main body, the method including: the system determining from the validity state information whether the consumable is valid for use with the main body and, if the system determines from the validity state information that the consumable is not valid for use with the main body, inhibiting use of the consumable with the main body.

A method according to the second non-limiting aspect of the present disclosure may include a method step or feature corresponding to any feature or process described in connection with the first non-limiting aspect of the present disclosure.

A third non-limiting aspect of the present disclosure may provide a system for managing a smoking substitute device including: a smoking substitute device; a mobile device on which an application is installed, wherein the smoking substitute device is configured to communicate with the application; an application server, wherein the mobile phone is configured to communicate with the application server, and wherein the application server stores validity state information associated with the smoking substitute device from which it can be determined whether the smoking substitute device is valid for use; wherein the smoking substitute device stores ID information identifying the smoking substitute device; wherein the smoking substitute device, application and/or application server is/are configured to determine whether the smoking substitute device is valid for use based on the ID information identifying the smoking substitute device and the validity state information associated with the smoking substitute device and, if the smoking substitute device, application and/or application server determines that the smoking substitute device is not valid for use, issue a disable signal configured to disable the smoking substitute device.

In this way, a mechanism is provided by which the smoking substitute device can be disabled by an application server administrator through the administrator changing the validity state information at the application server, after the consumable has left the control of a supplier (e.g. brand owner) of the consumable. This may be useful if the smoking substitute device is reported as being lost or stolen by a user (e.g. via the application or through customer support), or if the smoking substitute device is found by the supplier to be defective such that it should not be used. The existence of this mechanism may deter stealing of the smoking substitute device and/or may protect against use of a lost/stolen device by children.

By way of example, the validity state information associated with the smoking substitute device could include an invalidity flag. The invalidity flag associated with the smoking substitute device could be configured to have a 'valid' state (indicating that the smoking substitute device is valid for use) and one or more 'invalid' states (indicating that the smoking substitute device is invalid for use). Note that there could be more than one 'invalid' states, e.g. a first invalid state indicating that the smoking substitute device is invalid and should be disabled permanently and a second invalid state indicating that the smoking substitute device is invalid and should be disabled non-permanently.

The determination by the smoking substitute device, application and/or application server of whether the smoking substitute device is valid for use may include the smoking substitute device, application and/or application server using the ID information to check whether the invalidity flag associated with the smoking substitute device indicates that the smoking substitute device is valid or invalid for use. If (upon checking) the invalidity flag associated with the smoking substitute device indicates that the consumable is invalid for use, it may be determined that the smoking substitute device is not valid for use.

Other examples of validity state information associated with the smoking substitute device could be envisaged by a skilled person.

A local copy of the validity state information stored at the application server may be stored by the application and/or the smoking substitute device. The/each local copy may be updated periodically by the application server.

For avoidance of any doubt, there are various routes by which the smoking substitute device, application and/or application server could determine whether the smoking substitute device is valid for use based on the ID information identifying the smoking substitute device and the validity state information associated with the smoking substitute device. For example, the smoking substitute device could store a local copy of validity state information stored at the application server, and the smoking substitute device could use the ID information identifying the smoking substitute device and its local copy of the validity state information to determine whether the smoking substitute device is valid for use. As another example, the smoking substitute device could send the ID information identifying the smoking substitute device to the application, the application could store a local copy of validity state information stored at the application server, and the application could use the ID information sent to it by the smoking substitute device and its local copy of the validity state information to determine whether the smoking substitute device is valid for use. As another example, the smoking substitute device could send the ID information identifying the smoking substitute device to the application server (via the application), and the application server could use the ID information sent to it by the smoking substitute device (via the application) and the validity state information stored at the application server to determine whether the smoking substitute device is valid for use. Other routes could be envisaged by a skilled person.

In certain non-limiting embodiments, the ID information identifying the smoking substitute device uniquely identifies the smoking substitute device. The ID information identifying the smoking substitute device could alternatively identify a batch of smoking substitute devices to which the smoking substitute device belongs.

The ID information stored by the smoking substitute device could for example take the form of a unique ID number.

The validity state information associated with the smoking substitute device may be associated with the smoking substitute device by being stored in association with the ID information identifying the smoking substitute device (e.g. at the application server), e.g. with the ID information identifying the smoking substitute device and the validity state information associated with the smoking substitute device being stored in the same row of a table at the application server.

The disable signal could be configured to disable the smoking substitute device, for example, by instructing the smoking substitute to configure itself to not activate (e.g. not pass electrical power to a heating device of the smoking substitute device).

For avoidance of any doubt, the disable signal could be issued by the smoking substitute device, application and/or application server. If the disable signal is issued by the application server, in certain non-limiting embodiments, it instructs disabling of the smoking substitute device via the application connected to the smoking substitute device. For avoidance of any doubt, the smoking substitute device may issue a disable signal to itself.

The disable signal may be configured to disable the smoking substitute device permanently or non-permanently, e.g. depending on the validity state information associated with the smoking substitute device (e.g. as stored at the application server). For example, as discussed above, an invalidity flag associated with the smoking substitute device could be configured to have (in addition to a valid state) a first invalid state indicating that the smoking substitute device is invalid and should be disabled permanently, and a second invalid state indicating that the smoking substitute device is invalid and should be disabled non-permanently.

Permanently disabling the smoking substitute device (which may be referred to as a "super block") may be appropriate if the smoking substitute device is defective such that it should not be used.

Non-permanently disabling the smoking substitute device (which may be referred to as a "removable block") may be appropriate if the smoking substitute device is reported as lost/stolen.

If the disable signal is configured to disable the smoking substitute device non-permanently, the smoking substitute device, application and/or application server may be configured to issue a re-enable signal configured to re-enable the smoking substitute device if one or more re-enablement criteria are met.

The re-enable signal could be configured to re-able the smoking substitute device, for example, by instructing the smoking substitute to configure itself to be able activate (e.g. to allow electrical power to be passed to a heating device of the smoking substitute device).

For avoidance of any doubt, the re-enable signal could be issued by the smoking substitute device, the application and/or the application server. If the re-enable signal is issued by the application server, in certain non-limiting embodiments, it instructs re-enabling of the smoking substitute device via the application connected to the smoking substitute device. In certain non-limiting embodiments, the re-enable signal is issued by the application and/or the application server. However, for avoidance of any doubt, the smoking substitute device may issue a re-enable signal to itself.

An example re-enablement criterion may include a user passing a verification process at the application, which may involve e.g. the application verifying whether the smoking substitute device is registered to a user based on user input entered at the mobile device (information linking registered users to smoking substitute devices could be stored at the application server as part of the validity state information).

Another example re-enablement criterion may include the validity state information associated with the smoking substitute device at the application server being changed (from indicating the smoking device is invalid for use) to indicate that the smoking substitute device is valid for use (as might be happen if a user has reported that their smoking substitute device is no longer lost/stolen).

Another example re-enablement criterion may include a user entering a valid code via a user interface on the smoking substitute device.

Thus, if a user finds a previously lost/stolen device, they can re-enable their device.

In certain non-limiting embodiments, the smoking substitute device is configured to communicate wirelessly with the application.

In certain non-limiting embodiments, the smoking substitute device is configured to communicate wirelessly with the application via a communication channel established directly between the smoking substitute device and the mobile device on which the application is installed.

The system may include one or more further smoking substitute devices configured to be wirelessly connected to the smoking substitute device, e.g. with the smoking substitute device and the further smoking substitute devices forming a wireless mesh network. The smoking substitute device may be connected directly to the/each further smoking substitute device, but the smoking substitute device could also be connected indirectly to one or more of the further smoking substitute devices (e.g. via another of the smoking substitute devices).

The application server may store validity state information associated with the/each further smoking substitute device (a local copy of this information may also be stored at the application and/or smoking substitute device).

The/each further smoking substitute devices may store ID information identifying the further smoking substitute device.

For the/each further smoking substitute device, the smoking substitute device, application and/or application server may be configured to determine whether the further smoking substitute device is valid for use based on the ID information identifying the further smoking substitute device and the validity state information associated with the further smoking substitute device and, if the smoking substitute device, application and/or application server determines that the further smoking substitute device is not valid for use, issue a disable signal configured to disable the further smoking substitute device.

This could be achieved, by example, by the/each further smoking substitute device sending its ID information to the smoking substitute device, from where the smoking substitute device, application and/or application could determine validity for example in a manner described above.

In this way, a smoking substitute device can be disabled, even when it is not itself connected directly to a mobile device on which an application for managing the mobile device is installed.

The smoking substitute device may be a vaping smoking substitute device, or a heat not burn smoking substitute device. The smoking substitute device may include a main body and a consumable configured to physically couple to the main body (in which case the main body can be viewed as the smoking substitute device configured to perform the steps described above in relation to this aspect of the present disclosure), but this is not a requirement since, for example, the smoking substitute device could be a disposable "one-use" device, or an open system device e.g. having a tank that is configured to be refilled by a user so the device can be used multiple times.

A fourth non-limiting aspect of the present disclosure may provide a method performed by a system according to the third non-limiting aspect of the present disclosure.

The fourth non-limiting aspect of the present disclosure may, for example, provide a method performed by a system for managing a smoking substitute device, wherein the system includes: a smoking substitute device; a mobile device on which an application is installed, wherein the smoking substitute device is configured to communicate with the application; an application server, wherein the mobile phone is configured to communicate with the application server, and wherein the application server stores validity state information associated with the smoking substitute device from which it can be determined whether the smoking substitute device is valid for use; wherein the smoking substitute device stores ID information identifying the smoking substitute device; wherein the method includes: the smoking substitute device, application and/or application server determining whether the smoking substitute device is valid for use based on the ID information identifying the smoking substitute device and the validity state information associated with the smoking substitute device and, if the smoking substitute device, application and/or application server determines that the smoking substitute device is not valid for use, issue a disable signal configured to disable the smoking substitute device.

A method according to the fourth non-limiting aspect of the present disclosure may include a method step or feature corresponding to any feature or process described in connection with the third non-limiting aspect of the present disclosure.

The present disclosure includes the combination of the aspects and particular features described except where such a combination is clearly impermissible or expressly avoided.

In particular, a system for managing a smoking substitute device according to the first non-limiting aspect of the present disclosure may also include the features of a system for managing a smoking substitute device according to the third non-limiting aspect of the present disclosure.

For example, an application server may store both validity state information from which it can be determined whether a consumable is valid for use with a main body of a smoking substitute device as well as validity state information associated with a smoking substitute device from which it can be determined whether the smoking substitute device is valid for use.

A system which is able to incorporates features from both a system according to the first non-limiting aspect of the present disclosure and a system according to the third non-limiting aspect of the present disclosure is described below, for example.

Similarly, a method for managing a smoking substitute device according to the second non-limiting aspect of the present disclosure may also include the features or method steps of a method for managing a smoking substitute device according to the fourth non-limiting aspect of the present disclosure.

Aspects and embodiments of the present disclosure will now be discussed with reference to the accompanying figures. Further aspects and embodiments will be apparent to those skilled in the art. All documents mentioned in this text are incorporated herein by reference.

FIG. 1 shows an example system 1 for managing a smoking substitute device 10.

The system 1 as shown in FIG. 1 includes a mobile device 2, an application server 4, an optional charging station 6, as well as the smoking substitute device 10.

The smoking substitute device 10 is configured to communicate wirelessly, e.g. via Bluetooth™, with an application (or "app") installed on the mobile device 2, e.g. via a suitable wireless interface (not shown) on the mobile device 2. The wireless connection between the smoking substitute device 10 and the mobile device may be occasional, or intermittent. The mobile device 2 may be a mobile phone, for example. The application on the mobile phone is configured to communicate with the application server 4, via a network 8. The application server 4 may utilise cloud storage, for example.

The network 8 may include a cellular network and/or the internet.

A skilled person would readily appreciate that the mobile device 2 may be configured to communicate via the network 8 according to various communication channels, such as (but not limited to) a wireless communication channel such as via a cellular network (e.g. according to a standard protocol, such as 3G or 4G) or via a WiFi network.

The app installed on the mobile device and the application server 4 may be configured to assist a user with their smoking substitute device 10, based on information communicated between the smoking substitute device 10 and the app and/or information communicated between the app and the application server 4.

The charging station 6 (if present) may be configured to charge (and optionally communicate with) the smoking substitute device 10, via a charging port on the smoking substitute device 10. The charging port on the smoking substitute device 10 may be a USB port, for example, which may allow the smoking substitute device to be charged by any USB-compatible device capable of delivering power to the smoking substitute device 10 via a suitable USB cable (in this case the USB-compatible device would be acting as the charging station 6). Alternatively, the charging station could be a docking station specifically configured to dock with the smoking substitute device 10 and charge the smoking substitute device 10 via the charging port on the smoking substitute device 10.

FIG. 2(a) shows an example smoking substitute device 110 for use as the smoking substitute device 10 in the system 1 of FIG. 1.

In this example, the smoking substitute device 110 includes a main body 120 and a consumable 150. The consumable 150 may alternatively be referred to as a "pod".

In this example, the smoking substitute device 110 is a closed system vaping device, wherein the consumable 150 includes a sealed tank 156 and is intended for one-use only.

FIG. 2(a) shows the smoking substitute device 110 with the main body 120 physically coupled to the consumable 150.

FIG. 2(b) shows the main body 120 of the smoking substitute device 110 without the consumable 150.

FIG. 2(c) shows the consumable 150 of the smoking substitute device 110 without the main body 120.

The main body 120 and the consumable 150 are configured to be physically coupled together, in this example by pushing the consumable 150 into an aperture in a top end 122 of the main body 120. In other examples, the main body 120 and the consumable could be physically coupled together by screwing one onto the other, or through a bayonet fitting, for example. An optional light 126, e.g. an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown in FIG. 2) so that air can be drawn into the smoking substitute device 110 when a user inhales through the mouthpiece. At a bottom end 154 of the consumable 150, there is located a tank 156 that contains e-liquid. The tank 156 may be a translucent body, for example.

In certain non-limiting embodiments, the tank 156 includes a window 158, so that the amount of e-liquid in the tank 156 can be visually assessed. The main body 120 includes a slot 128 so that the window 158 of the consumable 150 can be seen whilst the rest of the tank 156 is obscured from view when the consumable 150 is inserted into the aperture in the top end 122 of the main body 120.

The tank 156 may be referred to as a "clearomizer" if it includes a window 158, or a "cartomizer" if it does not.

Figure 3A:
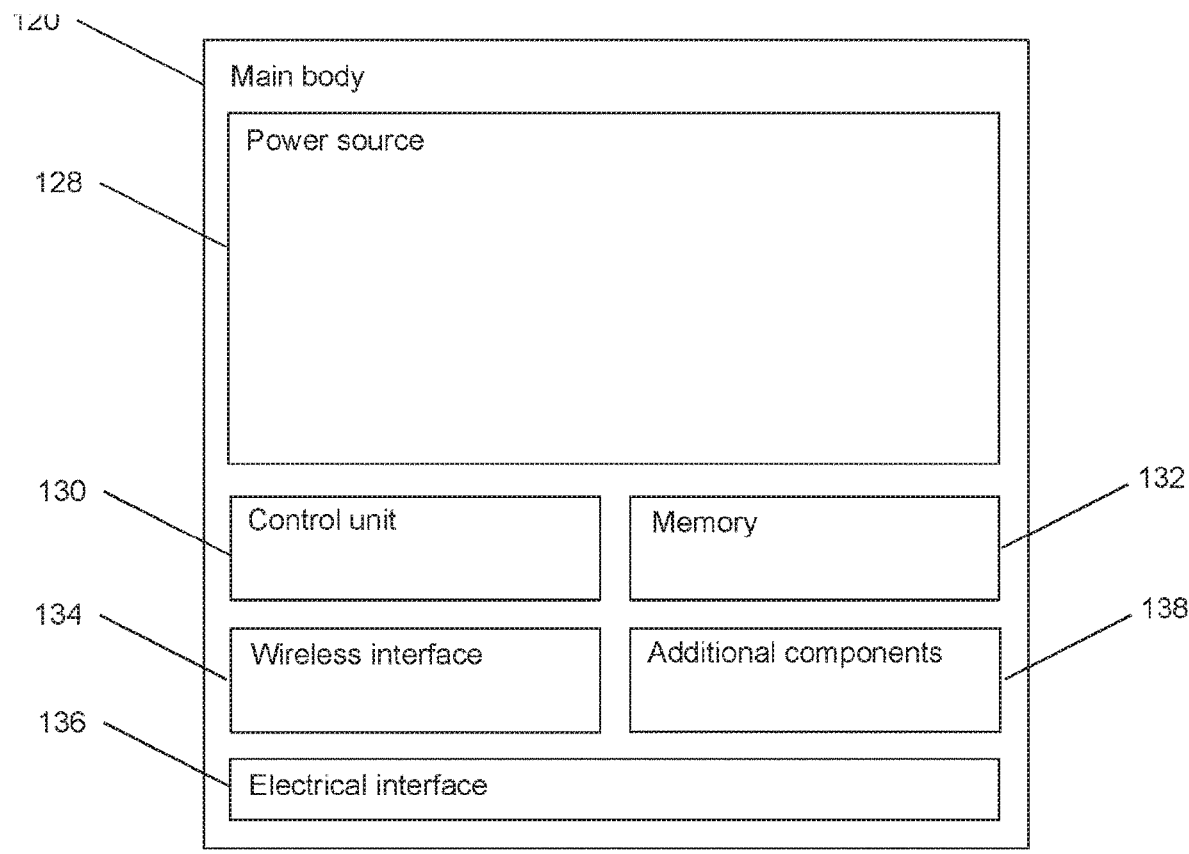
FIG. 3(a) is a schematic view of the main body of the smoking substitute device of FIG. 2(a).

FIG. 3(a) is a schematic view of the main body 120 of the smoking substitute device 110.

Figure 3B:
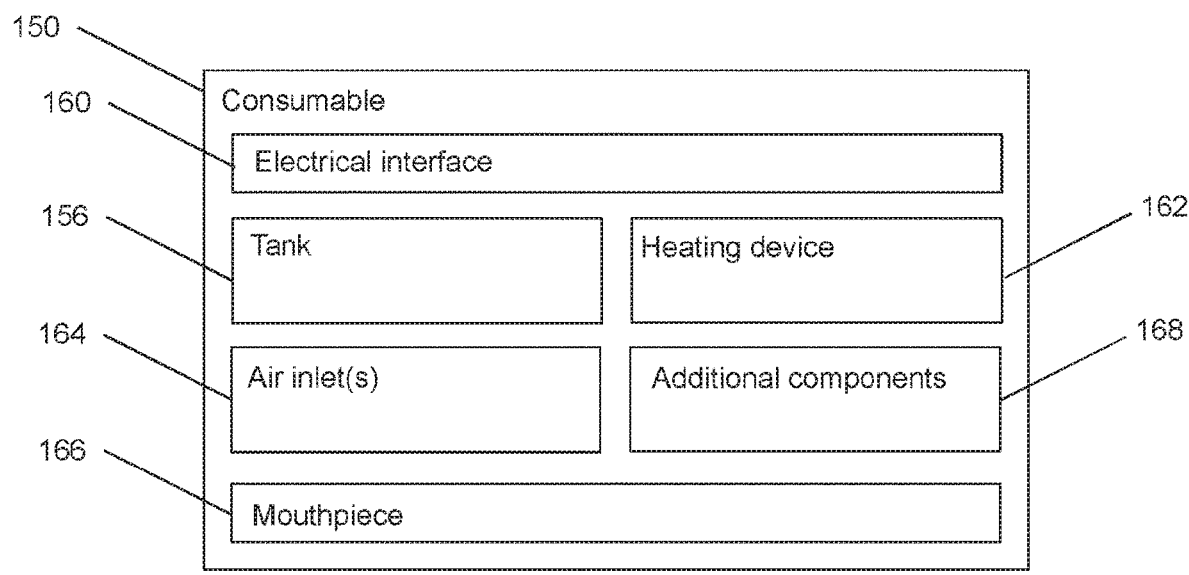
FIG. 3(b) is a schematic view of the consumable of the smoking substitute device of FIG. 2(a).

FIG. 3(b) is a schematic view of the consumable 150 of the smoking substitute device 110.

As shown in FIG. 3(a), the main body 120 includes a power source 128, a control unit 130, a memory 132, a wireless interface 134, an electrical interface 136, and, optionally, one or more additional components 138.

In certain non-limiting embodiments, the power source 128 is a battery, such as (but not limited to) a rechargeable battery.

The control unit 130 may include a microprocessor, for example.

In certain non-limiting embodiments, the memory 132 is includes non-volatile memory.

In certain non-limiting embodiments, the wireless interface 134 is configured to communicate wirelessly with the mobile device 2, e.g. via Bluetooth. To this end, the wireless interface 134 could include a Bluetooth™ antenna. Other wireless communication interfaces, e.g. WiFi, are also possible.

The electrical interface 136 of the main body 120 may include one or more electrical contacts. The electrical interface 136 may be located in, and in certain non-limiting embodiments at the bottom of, the aperture in the top end 122 of the main body 120. When the main body 120 is physically coupled to the consumable 150, the electrical interface 136 may be configured to pass electrical power from the power source 128 to (e.g. a heating device of) the consumable 150 when the smoking substitute device 110 is activated, e.g. via the electrical interface 160 of the consumable 150 (discussed below). When the main body 120 is not physically coupled to the consumable 150, the electrical interface may be configured to receive power from the charging station 6.

The additional components 138 of the main body 120 may include the optional light 126 discussed above.

The additional components 138 of the main body 120 may, if the power source 128 is a rechargeable battery, include a charging port configured to receive power from the charging station 6. This may be located at the bottom end 124 of the main body 120. Alternatively, the electrical interface 136 discussed above is configured to act as a charging port configured to receive power from the charging station 6 such that a separate charging port is not required.

The additional components 138 of the main body 120 may, if the power source 128 is a rechargeable battery, include a battery charging control circuit, for controlling the charging of the rechargeable battery. However, a battery charging control circuit could equally be located in the charging station 6 (if present).

The additional components 138 of the main body 120 may include an airflow sensor for detecting airflow in the smoking substitute device 110, e.g. caused by a user inhaling through a mouthpiece 166 (discussed below) of the smoking substitute device 110. The smoking substitute device 110 may be configured to be activated when airflow is detected by the airflow sensor. This optional sensor could alternatively be included in the consumable 150 (though this is less desired (but not by way of limitation) where the consumable 150 is intended to be disposed of after use, as in this example).

The additional components 138 of the main body 120 may include an actuator, e.g. a button. The smoking substitute device 110 may be configured to be activated when the actuator is actuated. This provides an alternative to the airflow sensor noted, as a mechanism for activating the smoking substitute device 110.

The additional components 138 of the main body 120 may include an RFID reader. The RFID reader could be configured to read an RFID tag on the consumable 150 when (and in certain non-limiting embodiments, only when) the consumable 150 is physically coupled to the main body.

As shown in FIG. 3(b), the consumable 150 includes the tank 156, an electrical interface 160, a heating device 162, one or more air inlets 164, a mouthpiece 166, and, optionally, one or more additional components 168.

The electrical interface 160 of the consumable 150 may include one or more electrical contacts. The electrical interface 136 of the main body 120 and an electrical interface 160 of the consumable 150 are configured, in certain non-limiting embodiments, to contact each other and therefore electrically couple the main body 120 to the consumable 150 when the main body 120 is physically coupled to the consumable 150. In this way, electrical energy (e.g. in the form of an electrical current) is able to be supplied from the power source 128 in the main body 120 to the heating device 162 in the consumable 150.

In certain non-limiting embodiments, the heating device 162 is configured to heat e-liquid contained in the tank 156, e.g. using electrical energy supplied from the power source 128. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapour.

In certain non-limiting embodiments, the one or more air inlets 164 are configured to allow air to be drawn into the smoking substitute device 110, when a user inhales through the mouthpiece 166.

The additional components 168 of the consumable 150 may include an identifier in the form of a machine readable tag which stores ID information identifying the consumable. The machine readable tag may be an RFID tag, for example.

In use, a user activates the smoking substitute device 110, e.g. through actuating an actuator included in the main body 120 or by inhaling through the mouthpiece 166 as described above. Upon activation, the control unit 130 may supply electrical energy from the power source 128 to the heating device 162 (via electrical interfaces 136, 166), which may cause the heating device 162 to heat e-liquid drawn from the tank 156 to produce a vapour which is inhaled by a user through the mouthpiece 166.

FIG. 4(*a*) shows an example of validity state information associated with a plurality of consumables 150 that could be stored at the application server 4.

In this example, the validity state information associated with a plurality of consumables 150 is stored at the application server 4 in the form of a table 401.

In table 401, the validity state information associated with each consumable 150 is stored in the same row as ID information identifying that consumable, thereby storing the validity state information associated with each consumable 150 in association with ID information identifying that consumable 150. Each item of ID information could uniquely identify a respective consumable 150 of the plurality of consumables, or could uniquely identify a respective batch of consumables that includes a plurality of consumables 150, for example.

In table 401, the validity state information associated with each consumable 150 includes an expiry date for the consumable as well as a lost/stolen flag (which functions as an invalidity flag as described above).

FIG. 4(*b*) shows an example of validity state information associated with a plurality of smoking substitute devices 110 that could be stored at the application server 4.

In this example, the validity state information associated with a plurality of substitute smoking devices 110 is stored at the application server 4 in the form of a table 402.

In table 402, the validity state information associated with each substitute smoking device 110 is stored in the same row as ID information identifying that substitute smoking device 110, thereby storing the validity state information associated with each substitute smoking device 110 in association with ID information identifying that substitute smoking device 110. In this example, each item of ID information uniquely identifies a respective main body 120 of a respective substitute smoking device 110 (since different consumables 150 may be used with a single main body 120).

In table 401, the validity state information associated with each substitute smoking device 110 includes a lost/stolen flag (which functions as an invalidity flag as described above).

FIG. 5(*a*) shows an example method that could be performed by the system 1, using the validity state information of FIG. 4(*a*).

In step S501, the main body 120 of smoking substitute device or the application installed on mobile device 2 reads ID information identifying the consumable 150 from a machine readable tag provided with the consumable 150.

For example, the main body 120 could include an RFID reader configured to read ID information identifying the consumable 150 from an RFID tag included in the consumable 150 when (and in certain non-limiting embodiments, only when) the main body 120 is physically coupled to the consumable 150. The main body 120 may be configured to wirelessly communicate this ID information to the application on the mobile device.

As another example, the application on the mobile device 2 may prompt a user to present a consumable to a component of the system 1 (e.g. to the main body 120 or the mobile device 2) so that that component of the system 1 can read ID information identifying the consumable 150 from an identifier provided with the consumable (e.g. in a manner as described above), before the user physically couples the consumable 150 to the main body 120 or whilst the consumable 150 is physically coupled to the main body 120.

In step S502, the ID information identifying the consumable 150 is used (e.g. by the application or application server 4) to look up the validity state information associated with the consumable 150 in the table 401 (e.g. in a manner as described above), and in step S503 this validity state information is then used (e.g. by the application server 4, application or main body 120, e.g. in a manner as described above) to determine whether the consumable 150 is valid for use with the main body 120.

In step S504, if it is determined from the validity state information associated with the consumable 150 that the consumable 150 is not valid for use with the main body 120, then use of the consumable 150 with the main body 120 is inhibited, for example by: a notification informing a user that the consumable 150 is not valid for use with the main body 120 being displayed (e.g. by the light 126 on the main body 120 being operated according to a predetermined sequence and/or a notification being displayed by the application on the mobile device); and/or the main body 120 being disabled such that it does not work with the consumable 150 (e.g. by configuring the main body 120 to not pass electrical power to the heating device 162 of the consumable 150 when the consumable 150 is physically coupled to the main body 120)

For example, if the expiry date associated with the consumable 150 has elapsed, or the lost/stolen flag associated with the consumable 150 indicates that the consumable 150 has been lost/stolen (as is the case for Consumable ID 000004 in table 401), then it may be determined that the consumable 150 is not valid for use with the main body 120. If an expiry date associated with the consumable 150 has elapsed, and a lost/stolen flag associated with the consumable 150 indicates that the consumable 150 has not been lost/stolen, then it may be determined that the consumable 150 is valid for use with the main body 120.

A user may provided with an option to override the notification and/or disabling of the main body 120, e.g. via the application, so that they can continue using the main body 120, even though they have been inhibited by doing so through the above steps.

FIG. 5(*b*) shows an example method that could be performed by the system 1, using the validity state information of FIG. 4(*b*).

In step S511, a user reports a main body 120 of a smoking substitute device 110 as lost/stolen, e.g. via the application or through a customer support helpline.

In step S512, validity state information associated with the main body 120 is changed at application server to indicate that main body 120 is invalid for use, e.g. by setting the lost/stolen flag associated with the main body 120 to indicate that the main body 120 has been lost/stolen (as is the case for Device ID 000001 in table 402).

A local copy of the validity state information stored at the application server 4 may be stored by the application and/or the smoking substitute device 110 (e.g. in the memory 132 of the smoking substitute device). The/each local copy may be updated periodically by the application server.

In step S513, the main body 120 connects to the application on the mobile device 2 and sends ID information, e.g. an ID number uniquely identifying the main body 120, to the application wirelessly, via the wireless interface 134, via the wireless interface 134 included in the main body.

In step S514, the application and/or the application server 4 determines whether the main body 120 is valid for use based on the ID information and the validity state information associated with the main body 120. The determination by the application and/or the application server 4 of whether the main body 120 is valid for use may, for example, include the application using the ID information sent to it by the smoking substitute device 110 and a local copy of the validity state information to determine whether the lost/stolen flag associated with the main body 120 indicates that the main body 120 is valid or invalid for use. Alternatively, this determination may include the application sending the ID information to the application server 4 so that the application server 4 can check whether the lost/stolen flag associated with the main body 120 indicates that the main body 120 is valid or invalid for use.

As an alternative, the main body 120 may determine whether it is valid for use by using its ID information and a local copy of the validity state information (e.g. which may recently have been updated by the application server 4) to determine whether the lost/stolen flag associated with the main body 120 indicates that the main body 120 is valid or invalid for use.

In step S515, if the application and/or the application server 4 determines that main body 120 is not valid for use (e.g. because the validity state information associated with the main body 120 indicates that the main body 120 has been lost/stolen, as is the case for Device ID 000001 in table 402), the application and/or application server 4 may issue a disable signal. This disable signal could be sent to the main body 120, which may be received at the main body via the wireless interface 134 included in the main body.

In step S516, the main body 120 is disabled on receipt of this disable signal, e.g. by the main body 120 being instructed by the signal to configure itself to not activate (e.g. not pass electrical power to the heating device 162).

In a further method (not illustrated) which builds on the method of FIG. 5(b), there may be one or more further main bodies 120 configured to be wirelessly connected to the main body 120. For example, the main body 120 may connect to a first further main body 120, wherein the main body 120 connects to the mobile device 2 on which the application is installed. Multiple main bodies 120 could be chained together in this way, or form a mesh network.

The application server 4 may store validity state information associated with the/each further main body 120 (a local copy of this validity state information may also be stored at the application and/or main body 120).

The/each main body 120 may store ID information identifying the further main body 120.

For the/each further main body 120, the main body 120, application and/or application server 4 may be configured to determine whether the further main body 120 is valid for use based on the ID information identifying the further main body 120 and the validity state information associated with the further main body 120 and, if the main body 120, application and/or application server 4 determines that the further main body 120 is not valid for use, issue a disable signal configured to disable the further main body 120.

This further method may allow for a main body 120 to be disabled, even if it is not connected (directly) to a mobile device 2.

Of course, a skilled reader would readily appreciate that the smoking substitute device 110 shown in FIGS. 2(a), 2(b), and 2(c) and FIGS. 3(a) and 3(b) shows just one example implementation of a smoking substitute device, and that other forms of smoking substitute device could be used as the smoking substitute device 10 of FIG. 1.

By way of example, a HNB smoking substitute device including a main body and a consumable could be used as the smoking substitute device 10 of FIG. 1, instead of the smoking substitute device 110. One such HNB smoking substitute device is the IQOS™ smoking substitute device discussed above.

As another example, for the method of FIG. 5(b), an open system vaping device which includes a main body, a refillable tank, and a mouthpiece could be used as the smoking substitute device 10 of FIG. 1, instead of the main body 120 of the smoking substitute device 110. One such open system vaping device is the blu PRO™ e-cigarette discussed above.

As another example, for the method of FIG. 5(b), an entirely disposable (one use) smoking substitute device could be used as the smoking substitute device 10 of FIG. 1, instead of the main body 120 of the smoking substitute device 110.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the present disclosure in diverse forms thereof.

While the present disclosure has been described in conjunction with the exemplary embodiments described above, many equivalent modifications and variations will be apparent to those skilled in the art when given this disclosure. Accordingly, the exemplary embodiments of the present disclosure set forth above are considered to be illustrative and not limiting. Various changes to the described embodiments may be made without departing from the spirit and scope of the present disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A system for managing a smoking substitute device, the system comprising:
    a smoking substitute device comprising a main body and a consumable configured to be physically coupled to the main body;

a mobile device on which an application is installed, wherein the main body is configured to wirelessly communicate with the application;

an application server, wherein the application on the mobile phone is configured to communicate with the application server;

wherein the consumable is associated with validity state information from which it can be determined whether the consumable is valid for use with the main body;

wherein the validity state information associated with the consumable is stored at the application server in association with ID information identifying the consumable at the application server;

wherein the system is configured to determine from the validity state information whether the consumable is valid for use with the main body and, if the system determines from the validity state information that the consumable is not valid for use with the main body, inhibit use of the consumable with the main body;

wherein the validity state information associated with the consumable comprises a lost/stolen flag, and wherein the determination by the system of whether the consumable is valid for use with the main body includes checking whether the lost/stolen flag associated with the consumable indicates that the consumable has been lost/stolen.

2. The system according to claim 1, wherein the validity state information associated with the consumable includes an expiry date, and wherein the determination by the system of whether the consumable is valid for use with the main body includes checking whether the expiry date has elapsed.

3. The system according to claim 1, wherein the validity state information associated with the consumable includes compatibility information for determining whether the main body is compatible with the consumable, and wherein the determination by the system of whether the consumable is valid for use with the main body includes checking whether the compatibility information indicates that the main body is compatible or not compatible with the consumable.

4. The system according to claim 1, wherein the system is configured to obtain validity state information associated with the consumable by:
reading ID information identifying the consumable from an identifier provided with the consumable; and
using the ID information to look up the validity state information associated with the consumable.

5. The system according to claim 4, wherein the identifier provided with the consumable is provided in the form of a machine readable tag which stores the ID information.

6. The system according to claim 1, wherein the main body is configured to read the validity state information from a machine readable tag provided with the consumable.

7. The system according to claim 6, wherein the machine readable tag is an RFID tag configured to be read by an RFID reader on the main body of the smoking substitute device, wherein the RFID reader and the RFID tag are respectively located in the main body and consumable so that the RFID reader can read the RFID tag on the consumable when the consumable is physically coupled to the main body.

8. The system according to claim 1, wherein the system is configured to, if it determines from the validity state information that the consumable is not valid for use with the main body, inhibit use of the consumable with the main body by displaying a notification for informing a user that the consumable is not valid for use with the main body.

9. The system according to claim 8, wherein the notification includes operating a light on the main body and/or a notification displayed by an application on a mobile device.

10. The system according to claim 8, wherein the system is configured to, if it determines from the validity state information that the consumable is not valid for use with the main body, inhibit use of the consumable with the main body by disabling the main body such that it does not work with the consumable.

11. The system according to claim 1, wherein the system may be configured to recognise when a consumable determined by the system as being not valid for use with the main body is physically coupled to the main body.

12. The system according to claim 11, wherein the system is configured to recognise when a consumable determined by the system as being not valid for use with the main body is physically coupled to the main body by:
the system being configured to obtain the validity information associated with the consumable whilst the consumable is physically coupled to the main body, then determining from the validity state information whether the consumable is valid for use with the main body.

13. The system according to claim 11, wherein the system is configured to recognise when a consumable determined by the system as being not valid for use with the main body is physically coupled to the main body by:
prompting a user to present an identifier provided with a consumable to a component of the system so that that component of the system can obtain/read ID information identifying the consumable from the identifier provided with the consumable, before the user physically couples the consumable to the main body or whilst the consumable is physically coupled to the main body;
using the ID information to look up the validity state information associated with the consumable; and
determining from the validity state information whether the consumable is valid for use with the main body.

14. A method performed by a system for managing a smoking substitute device, wherein the system includes:
a smoking substitute device comprising a main body and a consumable configured to be physically coupled to the main body;
a mobile device on which an application is installed, wherein the main body is configured to wirelessly communicate with the application; and
an application server, wherein the application on the mobile device is configured to communicate with the application server;
wherein the consumable is associated with validity state information from which it can be determined whether the consumable is valid for use with the main body, wherein the validity state information associated with the consumable is stored at the application server in association with ID information identifying the consumable at the application server; and wherein the method comprises:
the system determining from the validity state information whether the consumable is valid for use with the main body and, if the system determines from the validity state information that the consumable is not valid for use with the main body, inhibiting use of the consumable with the main body;
wherein the validity state information associated with the consumable comprises a lost/stolen flag, and wherein the system determines whether the consumable is valid for use with the main body by checking whether the lost/stolen flag associated with the consumable indicates that the consumable has been lost/stolen.

15. The system according to claim 1, wherein the application on the mobile device is configured to communicate the ID information to the application server included in the system and the application server looks up the validity state information associated with the consumable.

16. The system according to claim 1, wherein the ID information uniquely identifies the consumable, or uniquely identifies a batch of consumables that includes the consumable, wherein the ID information is configured to allow the validity state information associated with the consumable to be looked up by the system.

17. The system according to claim 1, wherein the identifier provided with the consumable is included on or within the consumable.

* * * * *